United States Patent [19]
Hagberg

[11] 4,118,149
[45] Oct. 3, 1978

[54] OUTPUT REGULATION IN HYDRAULIC AND HYDROPNEUMATIC SYSTEMS

[75] Inventor: Lars Hagberg, Borlänge, Sweden

[73] Assignee: Hytec AB, Borlänge, Sweden

[21] Appl. No.: 764,472

[22] Filed: Jan. 31, 1977

[30] Foreign Application Priority Data
Feb. 5, 1976 [SE] Sweden ................................. 7601234

[51] Int. Cl.² .......................... F09B 49/08; F16D 31/02
[52] U.S. Cl. ........................................ 417/26; 417/43; 417/213; 60/431; 60/468
[58] Field of Search ............... 417/43, 26, 218, 222, 417/213, 219; 60/431, 468

[56] References Cited
U.S. PATENT DOCUMENTS

| | | | |
|---|---|---|---|
| 3,067,693 | 12/1962 | Lambeck | 417/219 |
| 3,635,021 | 1/1972 | McMillen et al. | 417/213 |
| 3,768,928 | 10/1973 | Miller et al. | 417/222 |
| 3,812,676 | 5/1974 | Smith | 60/431 |
| 3,820,920 | 6/1974 | Klimaszewski et al. | 417/213 |
| 3,856,436 | 12/1974 | Lonnemo | 417/212 |
| 3,921,503 | 11/1975 | Kubik | 417/218 |
| 3,986,357 | 10/1976 | Hoffman | 60/468 |
| 3,987,625 | 10/1976 | Swatty | 60/431 |

FOREIGN PATENT DOCUMENTS

| | | | |
|---|---|---|---|
| 1,227,035 | 6/1967 | United Kingdom | 60/431 |
| 1,264,321 | 2/1972 | United Kingdom | 60/431 |

*Primary Examiner*—William L. Freeh
*Attorney, Agent, or Firm*—Hane, Roberts, Spiecens & Cohen

[57] ABSTRACT

Apparatus for regulating the output of a system feed with a fluid medium irrespective of the instantaneous pressure in the system comprising a regulating device including an adjustable throttling connected in the inlet line of the system. A preset non-return valve is connected downstream of the throttling and a spring loaded non-return valve is connected in series with the preset non-return valve and is fitted with a leakage connection extending to a reservoir tank. A control line is connected between the pre-set non-return valve and the spring loaded non-return valve and it senses pressure drop at the throttling so that when the pressure drop reaches a predetermined value the non-return valve opens so that fluid medium is transferred and pressure in the control line increases. A central device is connected in the control line for regulating a quantity of flow to the primary line and the control device comprises a spring loaded piston actuated by increased pressure in the control line.

15 Claims, 3 Drawing Figures

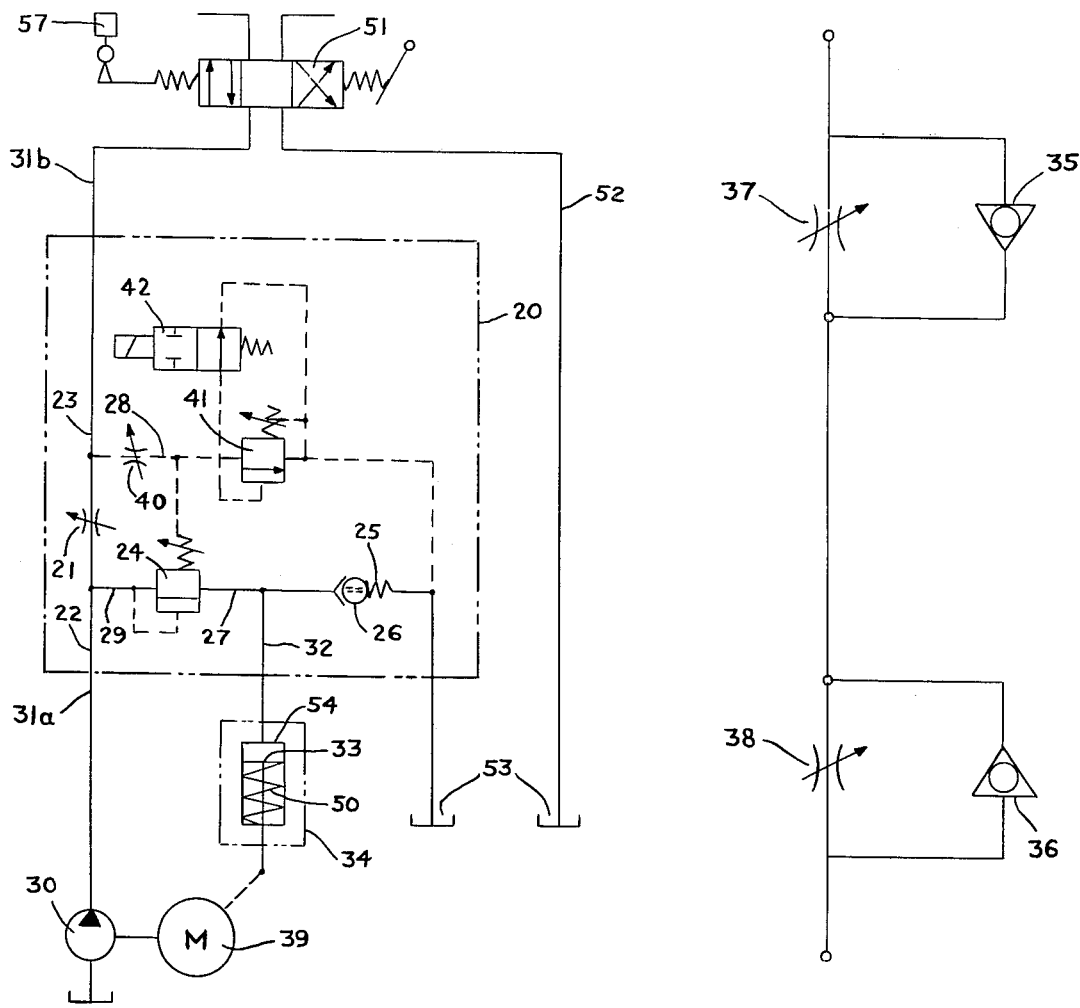
FIG. 1
FIG. 3
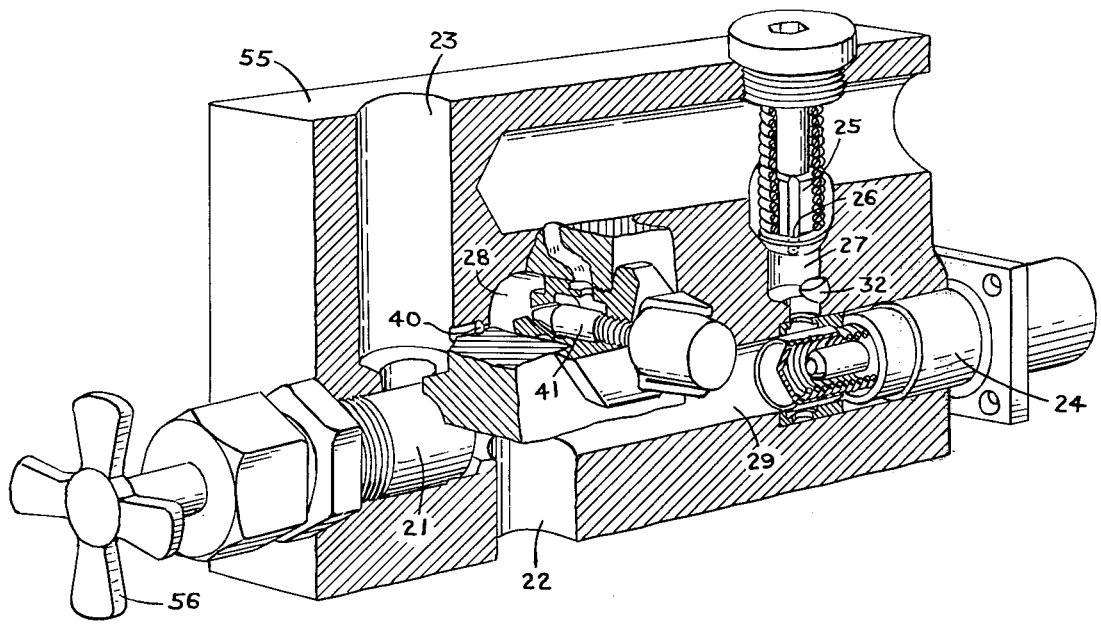
FIG. 2

OUTPUT REGULATION IN HYDRAULIC AND HYDROPNEUMATIC SYSTEMS

FIELD OF THE INVENTION

The present invention relates to apparatus for regulation of the output which is supplied to a hydraulic or hydropneumatic system, or more specifically, to regulation of the flow of the medium, which is supplied to the system, so that the quantity of flow admitted to the system always corresponds to the instantaneous flow requirements of the system.

PRIOR ART

In the systems applied now, there is usually a constant flow of medium from the inlet pump into the system, at any rate in connection with small systems. The volume of this flow corresponds to the maximum flow requirements of the system. The result of this is that an output is usually supplied to the system which exceeds the instantaneous output requirements of the system. Of the output supplied to the system only part is thus used for useful work, except when the system is loaded to the maximum. This is apart from the inevitable friction losses. The part of the supplied output which is not used for useful work thus makes up the lost output and it becomes heat in the system. In the cases when the variations in load are large the generation of heat in the system may have the effect, for example, that the hydraulic medium is heated so much that it will boil if it is a liquid. The heating of a hydraulic liquid, for example consisting of oil will cause several drawbacks. One disadvantage is that the viscosity of the liquid can be changed to such a degree that components of the system will have a poorer function or lack of function. In connection with boiling, harmful steam bubbles are formed, and if the hydraulic liquid is oil the boiling will even form slags, which will deposit in pipelines, valves, and filters. Even in this case the result will usually be poorer function or lack of function for the components of the system. The heating of the hydraulic liquid will even cause the gasket material to age very quickly and to harden. Furthermore, because of the production of slags and the high temperature the oil will become more acid much sooner. The slags and the acidification of the oil will have the effect that the intervals between changes of oil become shorter. Further, other kinds of service such as change of filter and gaskets must also be made at relatively short intervals.

There is no doubt that attempts have been made to reduce the output losses in order to reduce, in this way, the drawbacks caused by the heating of the hydraulic liquid. All of the solutions found have the drawback that, at least for small-scale systems, the energy supplied to the system exceeds the sum of the energy used for useful work and the energy required to overcome the friction losses. The above-mentioned losses and consequent heating still remain even though to a smaller extent. Examples of such solutions are systems with pressure-compensating pumps, servo systems with electronic devices for switching of the driving engine, and manually adjusted pumps. These solutions all have the drawback, however, that they offer insufficient regulation and/or high costs of installation and operation.

The trend towards higher energy prices also increases the requirements of preventing losses in hydraulic and hydropneumatic systems. Further, there are increasingly more stringent environmental requirements such as preventing unnecessary noise from engines working in compressors and dustcarts. This can be obtained by controlling the engines so that they are always working at the correct speed, i.e., they are prevented from working at too high a speed.

SUMMARY OF THE INVENTION

An object of the present invention is to provide apparatus which eliminates the above-mentioned drawbacks, and at the same time meeting the specified requirements. In connection with output regulation of hydraulic and hydropneumatic systems, according to the invention, the flow of medium to a system is adapted according to the instantaneous load on the system.

The required flow of medium in this system is supplied by means of a pump. In case the medium is a liquid, this will be supplied to the system from a storage tank and it will return to this tank after it has been applied. A corresponding arrangement will probably also apply in principle when the medium is a gas. According to the invention, the adjustment of the flow is either performed through regulation of the speed of a variable speed engine, which operates a pump with fixed displacement, or through regulation of the displacement in a variable displacement pump which is operated by a constant speed engine. The speed of the engine and the displacement of the pump respectively are adjusted to the instantaneous requirements of flow in the system. The adjustment given here is, in principle, independent of the current working pressure in the system.

A regulating device according to the invention is inserted into the pressure pipe from the pump to the system. The regulating device will instantaneously sense the flow requirements of the system and will adjust the flow from the pump consequently. In the case when the adjustment is effected through regulation of the speed of the pump, when the pump has fixed displacement, the flow is adjusted by regulating the speed of the engine which operates the pump. This method of regulation is suitable when it is easy to change the speed of the driving engine, e.g., when the engine is an internal combustion engine. It is suitable to regulate the displacement of the pump when the driving engine operates at a constant, e.g., an electric synchronous motor.

In the regulating device is arranged a throttling of the flow to the system. At this throttling there will be a difference of pressure, which is sensed. As the difference of pressure will rise as the flow increases, the volume of flow will be sensed in this way. The sensing is thus independent of the pressure in the system. At the same time, the regulating device will allow the volume of flow supplied by the pump to increase continuously until the sensed volume of flow corresponds to the pre-set value. When this value is exceeded, the regulating device will reduce the volume of flow supplied from the pump to a value which is lower than the pre-set value. Then the volume of flow supplied from the pump will increase again. This is a description of the method of operation of the regulating device when the flow requirements of the system are equal to or exceed the pre-set limiting value. In this way the first regulation of the flow to the system takes place.

In case the flow requirements of the system are lower than the value which corresponds to the limiting value mentioned above, a continuous increase of the supplied flow to the system will take place and thus an increase of the pressure in the whole of the system. This total pressure is sensed and when it exceeds a limiting value, which can be set, the regulating device will reduce the volume of flow supplied from the pump. For this regulation the above-mentioned sensing of the difference of pressure over the throttling is employed. When the pressure has reached the limiting value, an excess-pressure valve situated on the secondary side of the throttling will open.

This will increase the flow through the throttling until the sensed volume of flow corresponds to the pre-set value. In the same way as described above, the regulating device will then reduce the quantity of flow supplied from the pump as soon as the mentioned pre-set value is exceeded.

BRIEF DESCRIPTION OF THE DRAWING

The concept of the invention is carried into effect in the form of a practical hydraulic valve. However, this is only one example of how the idea of the invention can be realized. The invention is described in detail in connection with three figures of the drawings, where FIG. 1 is a circuit diagram for a device according to the present invention, FIG. 2 is a cut-away perspective view showing a regulating valve according to the invention, and FIG. 3 is a circuit diagram for control circuits intended to be inserted in connection with the control device of the regulating device towards the driving pump of the hydraulic system.

DETAILED DESCRIPTION

In FIG. 1 a frame 20 surrounds parts which are coupled together in order to work according to the invention. Within this frame is a throttling 21, which can be set at a desired size. This throttling is connected to an inlet connection 22 and an outlet connection 23, which are inserted in the primary line 31 a and b to the hydraulic system. The primary line 31 is fed from a pump 30, which is operated by a motor 39. Connected to the motor 39 is a control device 34, in which are a piston 33 and a spring 50. The piston 33 operates in the usual way in a cylinder 54. The volume formed by the cylinder and the piston is connected by a connection 32, hereafter called a control line, to the connection 27 between two pre-set non-return valves 24 and 25, of which one 24 hereafter is called a pre-set non-return valve and the other 25 a spring-loaded non-return valve. The different designations have been introduced in order to distinguish the parts in question. The line 31 a and b connects the pump 30 with the load 51 on the system. From the load the used hydraulic medium will return via a return line 52 to the storage tank 53.

The pre-set non-return valve 24 is connected to the inlet connection 22 via a connection 29 in such a way that, when it is open, it will connect the inlet connection 22 with a connection 27. The connection 27 is coupled with the spring-loaded non-return valve 25, which in an open position connects the connection 27 with the storage tank 53. The pre-set non-return valve 24 is connected with the outlet connection 23 via a connection 28 and a throttling 40. The connection of the pre-set non-return valve 24 with the connection 28 takes place from the spring-loaded side of the non-return valve.

This side has no direct connection with the connections 27 and 29. The spring-loaded non-return valve 25 is equipped with a leakage connection 26, which can be bored-up into the valve itself. To the connection 28 is also connected an excess-pressure valve 41, which in open position connects the connection 28 with the storage tank 53. The value of the pressure in the connection 28 at which the excess-pressure valve 41 will open can be adjusted.

The excess-pressure valve can be bypassed by means of a directional valve 42, which by means of exterior impulses can be changed between a position for blocking and a position for passage of the hydraulic medium. The control of the position of the directional valve is thus so that when the hydraulic system is operating the directional valve is in position for blocking. The mentioned impulses can be signals from a limit switch 57, a manually operated switch, etc., which signals will place the directional valve 42 in position for blocking when the system is operating. The function is independent of the type of signals. These can, for instance, be of electrical, hydraulic, pneumatic, mechanical or manual nature.

In FIG. 2 is shown an example of how the described circuit diagram, in principle, can be realized in a practical solution. In the Figure is found a valve casing 55, which in the practical presentation of the valve holds all of the described parts placed within the frame 20 according to FIG. 1. The individual parts described in FIG. 1, in addition to the connections between these, have, to the extent they have been found in the Figure, been given the same numeral designation as in FIG. 1. In the exterior parts situated outside the frame 20, which are required for the use of the device according to the invention, there is seen in FIG. 2 a wheel 56, which is used for setting of the throttling 21. Furthermore, in FIG. 2 are only included threads, nuts, and screws which are required for a practical realization of the invention.

In FIG. 3 are found two non-return valves 35, 36 and two throttlings 37, 38. The non-return valves are turned in opposition to each other. The throttlings can be adjusted.

The function of a device working according to the invention is easiest to understand if it is assumed that a certain quantity of hydraulic medium is available in the volume formed by the connection 27, the control line 32, and the cylinder 54. The mentioned quantity of hydraulic medium has then pressed the piston 33 against the spring 50, so that this is somewhat compressed. This causes an adjusting arm, connected with the piston 33, to be displaced somewhat from its original position, which entails that the motor 39 will be operating at a speed which is lower than the speed which corresponds to the original position of the piston. A change of the quantity of hydraulic medium in the volume will also result in a change of the position of piston 33 and even of the speed of the motor 39. As the piston 33 is moved continuously as the volume changes, the speed of the motor 39 will also be changed continuously. The spring 50 will, all the time act to return the piston 33 to its original position, and in this way it also maintains a certain pressure in the hydraulic medium in the volume in question. The spring-loaded non-return valve 25 contains a leakage connection 26, which has the effect that a flow of hydraulic medium constantly passes through the non-return valve to the storage tank 53. This will drain the mentioned volume of hydraulic medium continuously, which has the effect that the piston 33 will be displaced, in step with the emptying of the hydraulic medium, towards its original position. This will increase the speed of the motor 39 in proportion to the displacement of the piston.

The increased speed of the motor 39 has the effect that the pump 30 will supply an increasingly larger flow of hydraulic medium to the primary line 31 a, and thus also to the inlet connection 22. This flow will pass through the throttling 21 and from this further on through the outlet connection 23, the primary line 31 b, to the load 51, and from there back to the storage tank 53 via the outlet line 52. The increased flow to the primary line 31 a and consequently the connection 22 results in an even higher difference of pressure at the throttling 21. This difference of pressure is sensed by the pre-set non-return valve 24 through its connection to the connections 22 and 23. At a certain top value for the difference of pressure, the pre-set non-return valve 24 will open, and the connection 29 will be coupled with the connection 27. The volume which is formed by the connection 27, the control line 32, and the cylinder 54 is thus supplied with hydraulic medium, which will cause the piston 33 to be displaced from its position. This will again result in throttling of the speed of the motor 39 and thus a reduction of the flow supplied by the pump 30.

The pre-set non-return valve 24 will even open at a certain top pressure in the inlet connection 22. The pressure of the hydraulic medium will be reduced as mentioned at the throttling 21, so that it will always be lower on the secondary side of the throttling than on the primary side. An increase of pressure on the primary side is always followed by a corresponding increase of pressure on the secondary side, which has the effect that the set value of the excess-pressure valve will slowly be reached, if the pressure increase continues, the excess-pressure valve will open so that the hydraulic medium can pass from the connection 28 to the tank 53. This will lock the pressure on the primary side of the excess-pressure valve at the value set on the excess-pressure valve. In case of continued pressure increase in the inlet connection 22, the difference of pressure over the throttling 21 will be increased, which will be sensed by the pre-set non-return valve 24. This will open when the difference of pressure reaches the mentioned set value.

The throttling 40 connected to the connection 28 has several different functions. In connection with opened excess-pressure valve 41, a difference of pressure will arise at the throttling in question, which will add to the difference in pressure at the throttling 21. Therefore, the pre-set non-return valve 24 will open at a lower value of the flow than if the excess-pressure valve were shut, and in this way the flow from the pump 20 is kept down. At the same time the excess-pressure valve 41 will protect against overloading of the system as far as pressure is concerned. Increases of pressure in the system originating from the load 51 can also be so great that the excess-pressure valve 41 will open. The throttlings 40 and 21 can be set so that the pressure fall over the throttling 40 is sufficient to open the pre-set non-return valve 24 in spite of any counteracting pressure fall over the throttling 21. There will then be an adjustment down of the supplied flow to the system in the manner described above.

In case of a large supplement of hydraulic medium to the volume formed by the connection 27, the control line 32, and the cylinder 54 the pressure in the mentioned volume can become so high that the spring-loaded non-return valve 25 will open. This will result in a faster change of the speed of the motor and thus of the quantity of flow supplied by the pump 30 than when only the leakage connection 26 empties the mentioned volume of hydraulic medium.

The excess-pressure valve 41, as mentioned, is also a safety valve, which will prevent a too high pressure from arising in the outlet connection 23 and consequently in the entire system. The costs of a separate safety valve for the system are thus saved. When open, the excess-pressure valve 41 connects the connection 28 with the storage tank 53.

In this way, the hydraulic system is emptied of hydraulic medium and the pressure in the system in question is reduced to the allowed value. When this has taken place the excess-pressure valve 41 will close. The throttling 40 in the connection 28 will alone regulate the speed at which the pressure reduction in question takes place until the time when the pre-set non-return valve 24 opens. This is apart from any supplied hydraulic medium from the pump 30. The throttling 40, just as the excess-pressure valve 41, can be arranged for adjustable setting of the allowed quantity of flow and allowed maximum pressure respectively. The pre-set non-return valve 24 can even be opened if hydraulic medium flows from the load towards the regulating device, according to the invention.

In the above description of the invention it has been presupposed that the control device 34 regulates the speed of a motor 39. This method of regulation is suitable in those cases when the motor which is used is one whose speed can easily be adjusted, e.g., an internal combustion engine or an air engine. Such a motor will usually operate a pump with constant displacement. For other uses it may be suitable to work with motors with constant speed, e.g., electric synchronous motors and pumps with variable displacement. In this way, the control device will regulate the displacement of the pump instead.

For certain uses it may be necessary to adjust the speed at which the piston 33 in the cylinder 34 is moved from and towards its original position respectively. Another way of expressing this is to state that the time constant for inlet flow and outlet flow respectively of the hydraulic medium in the cylinder 54 is set. Such regulation of the time constant for change of the size of the part of the cylinder 54 filled with hydraulic medium is required for adjustment of the speed of the movement of the piston 33 towards the characteristic of the motor 39 and/or the pump 30.

The regulation of the time constant described in the previous paragraph is obtained by means of the components shown in FIG. 3 and connected in the manner shown in the Figure. The components connected in this way are connected between the control line 32 and the cylinder 34. In connection with the feeding of the hydraulic medium in the cylinder 34 the throttling 37 will regulate the volume of the flow, the non-return valve 35 being closed and the non-return valve 36 being open. In connection with the feeding of the hydraulic medium from the cylinder 34, the throttling 38 will regulate the volume of the flow, the non-return valve 36 being closed and the non-return valve 35 being open. In this way it is possible to obtain suitable and independent time constants for increase and reduction respectively of the flow fed from the pump 30 into the inlet line 31.

Other ways of reaching corresponding qualities are possible, e.g., the use of buffer volumes coupled to the volume formed by the connection 27, the control line 32, and the cylinder 34.

A device operating according to the invention makes it possible for the working pressure in a hydraulic system to always be maintained, as the device will adjust the flow from the pump 30 upwards as soon as the pressure in the cylinder 34 falls. This makes it possible, for instance, for a device according to the invention to be used to increase the safety in such hydraulic systems, where a low pressure in the hydraulic system may cause the risk of an accident. Examples of such systems are found in vehicles, for instance tractors. If an engine in a tractor has been idling so long, e.g., because of declutching on a long downgrade, that the pressure in the hydraulic system of the steering gear has dropped too much, it may happen that the steering of the tractor can malfunction.

The directional valve 42 is used in order to reduce the consumption of energy in systems where a more or less high steady pressure is not required. When the directional valve is in the position for passage, the hydraulic medium will pass from the pump to the tank, so that it will only be necessary to overcome the differences of pressure which are required to drive the hydraulic medium over the throttlings 21 and 40, and also over the spring-loaded non-return valve 25. As described above, the difference of pressure between the connections 22 and 28 will regulate the position of the pre-set non-return valve 24 and thus even the quantity of flow from the pump 30.

A considerable advantage of a device according to the invention is that it is connected with hydraulic systems without changing their construction. The device is only connected in the primary line of the hydraulic system, and furthermore the control line of the device is connected to a regulating device adapted to the motor in question and/or pump for flow of medium.

In the above description it has been stated that the device according to the invention operates with a hydraulic liquid as the fluid medium. Even though the invention has been described practically in connection with a device operating with a hydraulic liquid the concept of the invention is equally suitable for adaption to a gas, e.g., air as the fluid medium.

The invention has been described as a method for regulation of the flow of medium to a hydraulic and/or a hydropneumatic system. The method has been rendered concrete by relating the description to a circuit diagram (cf. FIGS. 1 and 3) and to a practical solution to the invention (cf. FIG. 2). There is no doubt that there are many other practical forms of the invention within the description of the invention, without departing from the scope thereof.

The invention has also been described as suitable for regulation of the speed in an internal combustion engine. There is no doubt that such a regulation can be extended to comprise all types of motors.

What is claimed is:

1. Apparatus for regulating the output of a system fed with a fluid medium irrespective of the instantaneous pressure in the system, said system having a primary line (31 a and b), the apparatus comprising a regulating device (20) connected to said primary line and including a throttling (21), which can be adjusted, an inlet connection (22) to said throttling and an outlet connection (23) connected to said throttling, which connections are connected to said primary line (31 a and b), a pre-set non-return valve (24), a spring-loaded non-return valve (25) fitted with a leakage connection (26), and further connections (27, 28, 29) for flow of medium between the connections and valves, a control line (32) connected with the connection (27) between the pre-set non-return valve (24) and the spring-loaded non-return valve (25), said pre-set non-return valve (24) sensing pressure drop at the throttling (21), and when this pressure drop reaches a certain value the non-return valve opens so that medium is transferred via the connection (29) to the connection (27), so that the pressure in the connection (27) and connected control line (32) increases, control device (34) for regulation of the quantity of flow to the primary line (31 a and b), said control device (34) comprising a spring-loaded piston (33) activated by increased pressure in control line (32) such that on the basis of the output pressure in the control line, the flow of medium to the primary line (31 a and b) is lower than said output pressure, when the pressure in the control line exceeds said output pressure, and is higher when the pressure in said control line is below said output pressure, whereby the pressure in the connection (27) and consequently the control line (32) will decrease continuously when the pre-set non-return valve (24) is closed, because the medium is pressed from the connection (27) through the leakage connection (26) in the spring-loaded non-return valve (25).

2. Apparatus as claimed in claim 1 further comprising, in series with the control line (32), two non-return valves (35, 36) turned in opposition with each other and following each other, where each non-return valve is bypassed by an adjustable throttling (37, 38), so that the time constant for inlet flow and outlet flow respectively of medium to and from the control device (34) respectively can be regulated, and thus even the time constant for change of flow of medium to the system.

3. Apparatus as claimed in claim 1 wherein the volume of the cylinder in the control device (34) complete with connections, the area of the leakage connection (26), the length of stroke of the cylinder (54), and the spring constant of the spring (50) are adjusted relative to each other in order to obtain a suitable time constant for levelling of the excess pressure in the volume formed by the cylinder in the control device (34) complete with connections.

4. Apparatus as claimed in claim 1 wherein the control device (34), for constant displacement of a pump or compressor (30) feeding the medium to the system, regulates the speed of a motor (39) for variation of a stated flow of medium from the pump or the compressor.

5. Apparatus as claimed in claim 1 wherein the control device (34), for connection with variable displacement in the pump (30) regulates this displacement for variation of the flow to the system.

6. Apparatus as claimed in claim 1 wherein the control device (34) in pneumatic systems controls a regulating device for determination of the quantity of flow from a gas container.

7. Apparatus as claimed in claim 1 wherein the medium is a liquid.

8. Apparatus as claimed in claim 1 wherein the medium is a gas.

9. Apparatus as claimed in claim 1 further comprising an excess-pressure valve (41), which can be adjusted, connected between the outlet connection (23) and a return line such that said excess-pressure valve will open at a certain pressure in the system, and the pressure in the outlet connection (23) is locked on this value, so that if the increase of pressure in the inlet connection (22) continues, the different of pressure at the throttling

(21) will cause the pre-set non-return valve (24) to open and the quantity of medium supplied to the system will fall.

10. Appparatus as claimed in claim 9 wherein the setting of the pre-set non-return valve (24) can be adjusted.

11. Apparatus as claimed in claim 10 wherein the leakage connection (26) is arranged in the spring-loaded non-return valve (25).

12. Apparatus as claimed in claim 10 wherein the leakage connection (26) is arranged as a separate channel bypassing the spring-loaded non-return valve (25), and an adjustable throttling arranged in said channel for setting of the quantity of the leakage flow.

13. Apparatus as claimed in claim 1 further comprising a throttling (40), which is adjustable, inserted in the connection (28) between the outlet connection (23) and an excess-pressure valve (41).

14. Apparatus as claimed in claim 13 wherein the area of the throttling (40) is primarily smaller than the area of the throttling (21) between the inlet connection (22) and the outlet connection (23), so that if the flow through the throttlings is the same, the difference of pressure at the throttling with the smaller area is larger than the difference of pressure at the throttling with the larger area.

15. Apparatus as claimed in claim 13 further comprising a directional valve (42) connected parallel with the excess-pressure valve (41), so that the directional valve is put in a position for passage when the system is in a steady position.

* * * * *